UNITED STATES PATENT OFFICE.

HENRY LAUFERTY, OF NEW YORK, N. Y.

PROCESS OF MANUFACTURING OLEOMARGARINE BUTTER.

SPECIFICATION forming part of Letters Patent No. 264,714, dated September 19, 1882.

Application filed June 9, 1882. (No specimens.)

*To all whom it may concern:*

Be it known that I, HENRY LAUFERTY, of the city, county, and State of New York, have invented certain new and useful Improvements in the Art of Manufacturing Oleomargarine Butter, of which the following is a specification.

It is my object to overcome certain defects in existing processes of making oleomargarine butter, which detract from the quality of the product and are a serious obstacle to its use. By my improvements I obtain a product very much superior, both in quality and in appearance, to others now in the market.

The most usual process of obtaining a butter-like product from oleomargarine is to mix in certain proportions soured milk or cream with oleomargarine, and then to churn the mixture to butter. This process is objectionable, for the reason that the product becomes sour and without flavor, and apparently the bulk of the milk does not become butter, nor does it make with the oleomargarine a homogeneous mass, since if the butter-like product thus made be heated the constituents separate, the oil rising to the top and the milk remaining at the bottom. The product, when packed and allowed to stand for any length of time, is also apt to mold.

Another way of making the butter-like product is to churn the soured milk or cream until butter comes before mixing it with the oleomargarine. The objection to this is that the butter particles thus obtained will not amalgamate with the oil, but will form globules which are distinctly to be seen in the product, imparting to it a spotted appearance, and this remains the case, even though the product be subsequently colored with the usual butter-coloring matter, because the butter globules or particles take a darker color than the oil. Furthermore, the butter particles are germs of rancidity which serve to soon render the product unfit for use. The same difficulty with respect to the oil and milk separating when the product is heated is experienced with this as with the other product.

By my invention I obviate the foregoing objections and obtain a product which possesses more of the characteristics of natural butter, is better and more palatable than other products of the kind, and is free from objectionable ingredients which are found in the latter.

The feature that characterizes my invention, so far as concerns the preparation of the compound of milk or cream and oleomargarine, is that I preliminarily prepare the soured milk or cream by only half churning it, by which I mean churning until the liquid thickens, but stopping the churning operation before butter comes, then separating the whey or thin liquid from the thicker part, and then mixing the latter substance only with the oil. This substance, of course, is not curds, nor is it either sour milk or butter. It is a creamy substance resembling the beaten white of an egg, but of somewhat thicker consistency, and is so light that it floats upon the oil. I find that this substance amalgamates with the oil during the churning operation and seemingly becomes an integral part of it, for when the resulting product is heated the two do not separate, nor does the product have a spotted appearance. It also imparts a flavor of natural butter to the product, and does not become rancid.

That my invention may be better understood, I will proceed to describe more in detail the manner in which I now prefer to practice it.

I take the milk or cream, sour it, and after souring it cool it with ice. This lowers its temperature and causes a distinct separation of the fatty portion from the residue or whey. I then place the milk or cream in a churn and churn for about five minutes, until it gets thick, but is nevertheless free from butter particles or globules. It is essential that the churning operation should cease before reaching the latter point. The whey or thin liquid is then drawn off, leaving a thick product—neither sour milk nor butter—having the characteristics above set forth. The oleomargarine, suitably prepared and heated—usually to about 95° Fahrenheit—is then run into the churn in proper quantity, the churn remaining at rest until the oil is all in. The milk or cream product rises and floats on the surface of the oil. I then churn for about forty minutes, and then, after adding flavoring and coloring matter, if desired, and working it into the product, remove the latter from the churn, after which I salt, work, and pack it in the usual way.

I have found that the quality of the butter-like product can be still further improved by preliminarily treating the oleomargarine in the following way: I place the oil in a suitable tank or vessel, and there, by means of suitable stirring or agitating mechanism, stir and work it until it appears of a fine consistency, like butter, smooth and uniform. I prefer to conduct this operation in the jacketed tank in which the oil is subsequently heated; but during the operation of agitating the oil the tank should be without heat and the oleomargarine should be cold, and if taken into the tank as it comes from the press the stirring operation should continue until it cools and obtains the consistence above referred to.

The agitator in the tank may be of any suitable construction, and should run at a comparatively slow rate of speed—say from twenty to twenty-five revolutions per minute. The agitator which I in practice employ consists of a rotating wooden cage or cylinder surrounding a shaft from which project paddles, the cylinder and shaft revolving in opposite directions. I obtain in this way a more perfect admixture and amalgamation of the component parts of the oil and break up the globular formations which are always observable when ordinary oleomargarine becomes mushy or hard. Oil after being thus treated will not when subjected to cold become as hard as the same oil previous to agitation, and when taken in the mouth it, like butter, dissolves slowly and leaves no globules. The untreated oil, on the contrary, under like conditions, breaks up in the mouth into globules of fat. The oil, when thus treated, becomes opaque—usually of a light yellow color—and perceptibly swells or increases in bulk and resembles butter of the same consistency in smoothness and uniformity.

Having described my improvements, what I claim as new and of my invention is—

1. The hereinbefore-described improvement in the art of manufacturing oleomargarine butter, which consists in partly churning the soured milk or cream until it reaches the consistency specified, separating the whey or thin liquid from the creamy thicker portion, mixing the latter with the oleomargarine, and churning the mixture, substantially as set forth.

2. The described process of making oleomargarine butter, which consists in mixing oleomargarine preliminarily prepared by agitating or beating it, substantially as described, and the product obtained by separating the thicker portion from the whey of partly-churned milk or cream, churning the mixture, adding coloring-matter, and also flavoring-matter, if desired, and finally salting and working the same, as hereinbefore set forth.

In testimony whereof I have hereunto set my hand this 8th day of June, 1882.

HENRY LAUFERTY.

Witnesses:
 EWELL A. DICK,
 P. B. DOING.